H. J. HAIGH.
MULTIPLE PAN.
APPLICATION FILED SEPT. 10, 1915.

1,221,725.

Patented Apr. 3, 1917.

WITNESSES

INVENTOR

ATTORNEY

UNITED STATES PATENT OFFICE.

HARRY J. HAIGH, OF NEW YORK, N. Y.

MULTIPLE PAN.

1,221,725.  Specification of Letters Patent.  Patented Apr. 3, 1917.

Application filed September 10, 1915. Serial No. 49,881.

*To all whom it may concern:*

Be it known that I, HARRY J. HAIGH, a citizen of the United States of America, residing at Stapleton, in the borough and county of Richmond, city and State of New York, have invented certain new and useful Improvements in Multiple Pans, of which the following is a specification.

My invention relates to multiple pans and it consists in the devices by which the units are firmly secured together without using rivets or equivalent devices in or through the walls of the pan.

Figure 1:
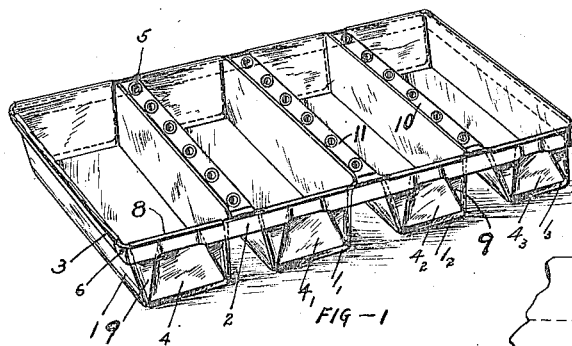
Figure 1 is a perspective view of a device embodying my invention and consisting of a multiple of four pans.
Figure 4:
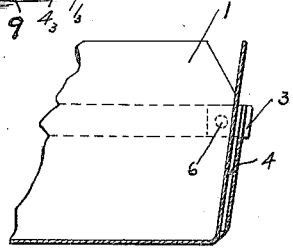
Fig. 4 is a sectional view of a part of a pan in course of construction.
Figure 2:
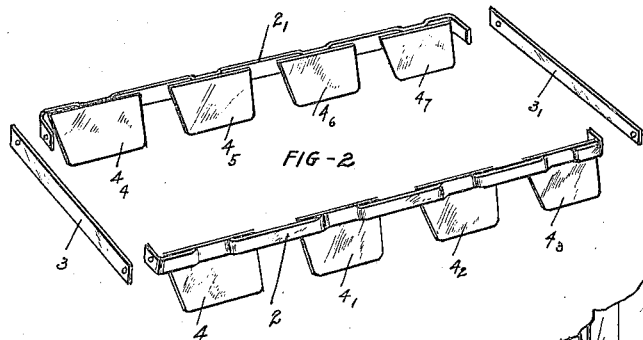
Fig. 2 is a perspective view of the connecting bar and the holding pieces, in the form I sometimes employ.
Figures 3, 5:
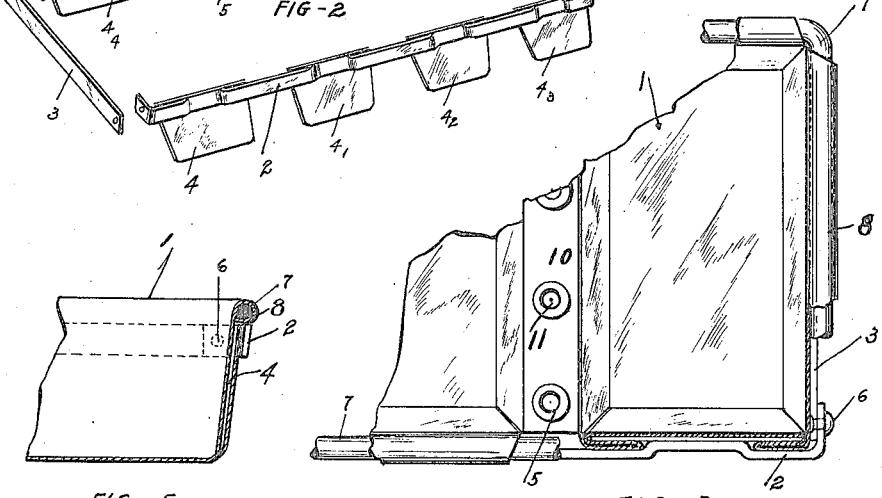
Fig. 3 is a plan view, on an enlarged scale, of parts of two pans of a multiple, portions being broken away to more fully exhibit the underlying parts.
Fig. 5 is a sectional view of part of a finished pan.

In making my pan I form a blank, usually from a sheet of tinned metal, and strike it up into the form of a pan 1, with wings, the metal at the corners, forming projecting wings 9, which are folded back on the lines of the corners of the pans as shown. Then I provide a connecting member, such as the rod 2 and to this rod or bar I weld or otherwise secure a plurality of thin flat pieces 4, $4^1$, etc., preferably of Russia iron, approximating the shape of the ends of the pan, which I prefer to form with an upward flare. The connecting bar 2 is formed to fit about the upper outer line of a plurality of pans placed side by side and the holding pieces 4 etc., preferably two for each pan, are so located as to then register with the ends of the respective pans.

Then the holding pieces 4, etc., are respectively inserted between the ends of the pans and the wings 9, and the wings are folded closely to the ends of the pans and against the holding pieces, after which the upper edges 8 of the ends of the pans may be curled over the connecting bar. If the parts of the connecting bar have not been already secured to the ends 3, that may be done by riveting or in any other suitable manner, one way being to make apertures in the ends, insert rivets with countersunk heads in the underlying parts, place the end parts with the holes in them in registry with the rivets, pass them over the projecting ends of the rivets and press down the rivets upon the outer faces of parts 3. For strength and convenience in placing, it is sometimes desirable that the connecting bar should have some width and be independent of the strengthening rod or wire, usually surrounding the edge of the pans, such for instance as 7. In such case, the bar 2—3 is made as before, and the upper edges of the pans are bound, as it were, by wires 7, extending around the entire series, or around each pan. The end edges 8 of the pans may then be turned over this wire, the result being that the connecting device is composed of the bar 2—3 and 7, the first of which cannot slip down because the holding piece 4 etc., secured to it, is held between the pan and the wings, and it cannot ride up because of the rod 7 which rests upon the upper edge of said bar 2—3 and is in turn held in place by the edge 8 of the pan which is turned over and upon it.

Figure 6:
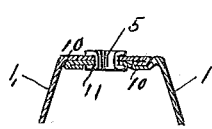
Fig. 6 is a sectional view of a part of the device, on a line cutting one of the fastening eyelets.

Those edges of the pan which are adjacent, one to the other, may be turned over independently or they may be formed into flat horizontal flanges 10 extending one over another and secured one to the other and to accomplish that and yet provide for the passage of air between the pans, they may be joined by eyelets 5, passing through apertures 11, and flattened down upon the outside of the other flange, as shown in Fig. 6, or the pan flange might be punched out so as to use the metal forced out of one flange to constitute an eyelet fastening for the next flange.

What I claim as my invention and desire to secure by Letters-Patent, is:—

1. A multiple pan, composed of a plurality of pans with wing extensions and a flange on one end, a connecting bar extending from one pan to another, a plurality of holding pieces secured to the connecting bar and extending down between the ends of the pans and the wings as wide as the pan, at some point above the lower edge, but decreasing in width downward from that point, and held in place by the flange extending outward from the end of the pan and over the connecting bar, all substantially as set forth.

2. A multiple pan, composed of a plurality of pans with wing extensions and a flange on one end, a connecting bar, extending about the entire series, a plurality of holding pieces secured to the connecting bar and extending down between the ends of the pans and the wings as wide as the pan, at some point above the lower edge, but decreasing in width downward from that point, and held in place by the flange extending outward from the end of the pan and over the connecting bar, all substantially as set forth.

3. A multiple pan, composed of a plurality of pans with wing extensions and a flange on the end, a connecting bar, extending from one pan to another, a plurality of holding pieces corresponding in shape with the ends of the pans and double in number to the pans, secured to the connecting bar and extending down between the ends of the pans and the wings as wide as the pan, at some point above the lower edge, but decreasing in width downward from that point, and held in place by the flange extending outward from the end of the pan and over the connecting bar, all substantially as set forth.

4. A multiple pan, composed of a plurality of pans with wing extensions and a flange at the upper end and the upper side, a connecting bar extending from one pan to another, a plurality of holding pieces secured to the connecting bar and extending down between the ends of the pans and the wings as wide as the pan, at some point above the lower edge, but decreasing in width downward from that point, and held in place by the flange extending outward from the end of the pan and over the connecting bar, said pans being also held together by fastenings uniting the side flanges, all substantially as set forth.

5. A multiple pan, composed of a plurality of pans with wing extensions and flanges, one at the upper end and one at the upper side, a connecting bar extending from one pan to another, a plurality of holding pieces secured to the connecting bar and extending down between the ends of the pans and the wings as wide as the pan, at some point above the lower edge, but decreasing in width downward from that point, and held in place by the flange extending outward from the end of the pan and over the connecting bar, said pans being also held together by means of eyelets extending through registering apertures in the side flanges lapped one over the next, all substantially as set forth.

6. A multiple pan, composed of a plurality of pans with wing extensions and a flange on one end, a connecting bar extending from one pan to another, a plurality of holding pieces secured to the connecting bar and extending down between the ends of the pans and the wings, as wide as the pan, at some point above the lower edge, but decreasing in width downward from that point, and held in place by the flange extending outward from the end of the pan and over the connecting rod and a rod binder extending along the edge of the pan and under the flange but above the bar, all substantially as set forth.

In testimony whereof, I have signed my name to this specification this 9th day of September, 1915.

H. J. HAIGH.